United States Patent [19]

Gurgiolo et al.

[11] Patent Number: 4,489,913

[45] Date of Patent: Dec. 25, 1984

[54] ELECTROCONDUCTIVE FOAMS

[75] Inventors: Arthur E. Gurgiolo, Lake Jackson; Thomas M. Knobel, Clute, both of Tex.

[73] Assignee: The Dow Chemical Company, Midland, Mich.

[21] Appl. No.: 591,306

[22] Filed: Mar. 19, 1984

[51] Int. Cl.$^3$ ............................................. C08J 9/36
[52] U.S. Cl. ..................................... 521/53; 521/94; 521/129; 521/137; 521/902
[58] Field of Search ............... 521/53, 94, 129, 137

[56] References Cited

U.S. PATENT DOCUMENTS 3,852,223  12/1974  Böehme et al. ..................... 260/2.3

OTHER PUBLICATIONS

"Synthesis of a Polymer Chain Having Conjugated Unsaturated Bonds by Dehydrohalogenation of Polyhalogen-Containing Compounds", *J. Polymer Science*, vol. 2, pp. 3347-3354, 1964, Tsuchida, Shih, Shinohara & Kambara.

"The Mechanisms of Complete Dehydrohalogenation of Polyhalogen-Containing Polymers", *Polymer Letters*, vol. 3, pp. 643-649, 1965, Tsuchida, Shih & Shinohara.

Chem. Abstracts, vol. 70, 4945e, 1967, "Chemical Modification of Polymer Films," III, Reaction of Vinylidene Chloride-Vinyl Chloride Copolymer Films with Various Amines.

"Organic Dispersible Saran: A Newly Discovered Combustibility Modifier for Low Density Rigid Urethane Foam:", *J. Cellular Plastics*, May/Jun. 1980, pp. 171-175, Neywick, Yeorger & Peterson.

*Primary Examiner*—Morton Foelak

[57]  ABSTRACT

Electroconductive foams are prepared by dehydrohalogenating a foam containing a halogen-containing polymer.

10 Claims, No Drawings

4,489,913

ELECTROCONDUCTIVE FOAMS

BACKGROUND OF THE INVENTION

The present invention pertains to electroconductive polyurethane, isocyanurate and/or polyurea foams and to a method for their preparation.

Polyurethane foams have heretofore been rendered electroconductive by impregnating the foam with an aqueous dispersion of conductive carbon black containing a binder or by impregnating the foam with a styrene butadiene binder containing conductive carbon or by wetting polyurethane foam paricles with binders and conductive carbon black and then molding to a desired configuration or by adding conductive carbon black to polyurethane prepolymer and then foaming.

The present invention provides a means for preparing electroconductive foams containing urethane groups, thiourethane groups, urea groups, thiourea groups, isocyanurate groups or mixtures of such groups.

SUMMARY OF THE INVENTION

The present invention pertains to a method for preparing an electroconductive foam which comprises (1) saturating a foam containing a plurality of urethane or thiourethane or urea or thiourea or isocyanurate or a combination of such groups which foam also contains a halogenated polymer with a dehydrohalogenating agent at a temperature and time sufficient to at least partially dehydrohalogenate the halogenated polymer; (2) washing the foam with a suitable inert medium so as to substantially remove the dehydrohalogenating agent and (3) drying the thus treated foam.

The present invention also concerns the foam prepared by the aforementioned process.

DETAILED DESCRIPTION OF THE PRESENT INVENTION

The foams of the present invention can be prepared by means known in the art which encompasses foaming a composition containing (1) an active hydrogen-containing component containing a plurality of —OH, —SH, >NH and/or —NH$_2$ groups, (2) a component containing a plurality of —NCO and/or —NCS groups, (3) at least one halogenated polymer, (4) catalysts and optionally (5) surfactants, pigments, fillers and the like.

Suitable active hydrogen-containing compounds include polyether and polyester polyols containing an average of from 2 to about 8 hydroxyl groups per molecule as well as the partially or totally aminated derivatives thereof all of which are well known in the art. Also suitable are the corresponding thiol derivatives of such polyether and polyester polyols.

The compounds containing —NCO and —NCS groups are likewise well known in the art.

Likewise suitable catalysts and foaming agents are well known in the art.

The foam of the present invention can be flexible, rigid, semi-rigid or semiflexible, open cell, closed cell, or reticulated.

Suitable halogenated polymers or copolymers which can be employed herein include, for example, chlorinated polyethylene, chlorinated acrylates and methacrylates, chlorinated paraffins, chlorinated polyacrylonitrile, chlorinated polyacrylic acid and methacrylic acid, chlorinated polystyrene, chlorinated vinyl esters, chlorinated vinyl ethers, as well as mixtures of each polymers and copolymers thereof with vinylidene chloride, acrylonitrile, styrene, vinyl ethers, ethylene, acrylic acid, acrylates, methacrylates, vinyl esters and the like, polyvinyl chloride polymers and copolymers with vinylidine chloride, acrylonitrile, styrene, vinyl esters, ethylene, acrylic acid, acrylates, methacrylates, vinyl esters, polyvinylidine chloride, polyvinylidine chloride copolymers, polyvinylidine fluoride and copolymers thereof.

The amount of halogenated polymer or copolymer that is suitably employed is that which provides from about 5 to about 100, preferably from about 20 to about 50 parts by weight of halogen atoms per 100 parts by weight of active hydrogen-containing component.

Any suitable dehydrohalogenating agent such as primary, secondary or tertiary amines, alkali metal hydroxides, carbonates, bicarbonates and the like can be employed herein although the amines are preferred.

Suitable amines that can be used to dehydrohalogenate the halogenated polymers and copolymers above described are the aliphatic primary, secondary and tertiary amines, having aliphatic moieties of from 1 to 8 or more carbon atoms as well as the higher polyalkylene polyamines of like alkylene carbon chain lengths, e.g. polyalkylene polyamines of molecular weights of, for example, 250. It is, of course, to be understood that the secondary and tertiary amines may contain different carbon chain length moieties. Further, mixtures of one or more amines from the above classes of amines may be employed. In addition, one may use alone, mixtures of two or more, or mixtures with the aforedescribed aliphatic amines of aromatic and cyclic amines as well as aromatic substituted aliphatic amines. Some of such amines representative of the numerous classes are methyl through octadecyl amine, dimethyl-, methylethyl- and the like, through dioctadecyl amines, trimethyl through trioctadecyl amines, aniline, diphenylamine, triphenylamine, benzyl amine, aromatic-aliphatic substituted amines, methyl aniline, dimethyl aniline, diamines and triamines, e.g. ethylenediamine, diethylenetriamine (DETA), triethylenetetramine (TETA), tripropylene diamine, etc., substituted amines, ethanolamine, diethanolamine, triethanolamine, substituted aromatic amines, chloroaniline, methoxy anilines, toluidines, aromatic diamines and triamines, benzene diamines, toluene diamines, methylene dianiline. Where the amines are solids, it is desirable to use solvents to aid the physical work up of the products. However, solvents may be and preferably are employed with all amines.

Suitable solvents are water; alcohols—methanol through octyldecyl alcohol; aromatics—benzene, toluene, xylenes, chlorinated aromatics, methoxybenzenes, phenols, ethyl benzene, dialkyl benzenes, ethers such as dialkylethers, cycloethers, glycol ethers such as methoxyethanol, ethoxyethanol, etc. Esters may be used with tertiary amines, but not with primary and secondary amines; hydrocarbons such as butanes through kerosene, etc. cycloaliphatic hydrocarbons. It is desirable to use solvents that can be removed easily from the products.

The amount of amine dehydrohalogenating agent is that which provides at least an equivalent of active amine nitrogen per equivalent of halogen desired to be removed from the polymer. For almost complete removal of halogen from a polymer an excess of amine, about 0.2 mole excess over stoichiometry, is desirable to ensure halogen removal. A large excess may be used; a 2 molar ratio of amine to halogen or more, if it is desired to use the amine as a carrier of diluent for the reaction.

Suitable media which can be employed to remove the dehydrohalogenating agent include water, alcohols, aromatic hydrocarbons, ethers, cycloethers and glycol ethers so long as the media does not degrade the foam, mixtures thereof and the like. Also, the treated foam can be washed with one media one or more times and subsequently washed with other media one or more times.

The electroconductivity of the foams of the present invention can be enhanced by treatment of the foam with dopants. Suitable such dopants include Lewis acids, halogens or alkali metals (liquid, solvent solutions and/or vapors). Lewis acids such as HCl, HI, HF, HBr, $H_2SO_4$, $F_3C(SO_2)OH$; halogens such as $I_2$, $Br_2$, $Cl_2$ and alkali metals such as Na and K are particularly useful. The amounts, times of treatment and temperature of treatment can be varied depending on whether only surface treatment is desired, a short time; or depth penetration is desired, a long time; or a short time high temperature, up to 250° C. Much of the technology employed in the prior art can be employed in treating the materials of the present invention with improvement in conductivity substantially commensurate with those teachings.

The temperature of the dehydrohalogenations can vary from about 15° C. to about 250° C., preferably from about 25° C. to about 120° C. The temperature is varied according to the ease of dehydrohalogenation of the halogenated polymer. Thus for PVC polymers the preferred temperature range is from about 60° to about 120° C.; Saran polymers from about 25° to about 60° C., initially, followed by higher temperatures if desired; chlorinated polyethylene from about 100° C. to about 120° C.

The dehydrohalogenation is time-temperature-amine dehydrohalogenation agent activity related as well as to the ease of halogen removal. Some wide variation in time is to be expected. Results have shown times from eight minutes (480 s) to eight hours (28,800 s) are normally sufficient to dehydrohalogenate at least the surface of the polymer or copolymer to produce a reasonably commercially acceptable electroconductivity. However, times from two minutes (120 s) to 14 days (1,209,600 s) may be required if the dehydrohalogenation agent is fast or slow at the temperature selected or if the polymer or copolymer is slow to react. Solvent dilution of the active amine may also be used to control the rate of dehydrohalogenation.

Pressure is not critical, atmospheric or superatmospheric pressures being employable. Superatmospheric pressure may be advantageous in causing the dehydrohalogenation of thick shapes to more rapidly dehydrohalogenate to greater depths.

The foams of the present invention are useful as packaging for electronic equipment, electrostatic and electromagnetic shielding, static dissipative carpet backing and floor covering, static dissipative plastic cabinetry, and the like.

The following examples are illustrative of the invention, but are not to be construed as to limiting the scope thereof in any manner.

EXAMPLE 1

A. Comparative

A conventional flexible polyurethane foam was prepared by mixing in a quart (0.95 l) size paper cup 100 parts by weight (pbw) of a polyether triol having an average molecular weight of about 3000 commercially available from The Dow Chemical Company as Voranol ®3137. 4.3 pbw water, 1.2 parts of L-540 a silicone surfactant commercially available from Union Carbide Corp. and Dabco ®33 LV a mixture of 33% by weight of triethylenediamine in dipropylene glycol commercially available from Air Products Co. Then a separate mixture of 0.715 parts of stannous octoate catalyst and 45.2 ml of an 80/20 mixture of 2,4-/2,6-toluenediisocyanate mixed with the polyol-containing mixture in a one-half gallon (1.89 l) cardboard cup. The resultant mixture foamed and filled the cup to give a cream-white colored flexible foam. The cream time was 18 sec., the rise time was 170 sec. and the gel time was 320 sec.

B. Measurement of the Resistance of Foam Samples

The foams from Example (1-A) above was cut into a $6'' \times 6'' \times 0.5''$ (152.4 mm $\times$ 152.4 mm $\times$ 12.7 mm) test piece.

Two nickel plated spring loaded steel clamps were connected by wire to a Keithley 660 electrometer set to measure resistance in ohms. The clamp jaws were flat and were 0.7" (17.78 mm) wide. The system had an internal resistance of 12 ohms.

The clamps were now clamped to opposite sides of a 6" (152.4 mm) square $\times \frac{1}{2}$" (12.7 mm) thick piece of control foam as made above. The clamps were spaced 4" (101.6 mm) apart. The resistance was now measured and found to be greater than $10^-$ohms. Even at a clamp spacing of 20 mm the foam resistance was greater than $10^{14}$ ohms.

To demonstrate that treatment of the control polyurethane foam (prepared in A above) with diethyltriamine (DETA) (as is done with foam containing SARAN 506 powder) does not decrease its resistance, a piece of foam prepared as in Example (1-A) was treated with DETA by immersion for 15 minutes (900 s). The foam was then thoroughly washed in water then in methanol then oven-dried at 135° C. overnite. It was tested as in Example (1-B). Its resistance at a clamp spacing of 4" (101.6 mm) was too high to read. At a clamp spacing of 20 mm the resistance was $1.7 \times 10^{12}$ ohm.

C. A flexible foam was made as in Example (1-A) except that 20 parts of copolymer of 90% vinyldiene chloride and 10% vinyl chloride powder were mixed in on the polyol side. On the isocyanate side 0.20 parts of stannous octoate catalyst were mixed in. The isocyanate and polyol were rapidly mixed and poured into a half gallon (1.89 l) cardboard cup. The flexible white foam resulted which had a cream time of 16 sec., a rise time of 150 sec. and a gel time of 195 sec.

The resistance of a piece of this foam 6" (152.4 mm) square and 0.5" (12.7 mm) thick was measured as described for the control (prepared in A above). With the clamps spaced 4" (101.6 mm) apart the resistance was too high to read. At a spacing of 20 mm a resistance of $1 \times 10^{12}$ ohm was measured.

A piece of this foam, 6" (15.24 cm) square and 0.5" (12.7 mm) thick, was now immersed in DETA for 15 minutes (900 s), pressing to remove all air bubbles entrapped in the foam. The color of the foam became first deep yellow then rapidly deep brown, then black. The foam was thoroughly washed in water to remove all DETA, then washed in methanol, pressed to remove all excess solvent, then dried overnite in a hot air oven at 135° C. The foam retained all its physical texture and did not seem to be physically harmed by the treatment with DETA, water, and alcohol. However, the color was now jet black.

The resistance of this sample was now measured as described before and at a 4" (101.6 mm) spacing of the clamps, a resistance value of $1.1 \times 10^8$ ohms was recorded.

D. Another foam was made as in Example (1-C) by adding 10 parts of the 90% vinylidene chloride 10% vinyl chloride copolymer powder and using 0.6 parts of stannous octoate catalyst in the isocyanate.

A 6"×6"×0.5" (152.4 mm×152.4 mm×12.7 mm) piece of this foam was treated with DETA for 20 minutes (1200 s), washed, and oven dried. The resistance of this black foam was $6 \times 10^5$ ohms at a 4" (101.6 mm) spacing of the electrodes.

E. Another foam was made using 40 parts of the 90% vinylidene chloride 10% vinyl chloride copolymer powder. It was treated with DETA for 30 minutes (1800 s) at 25° C. It was now washed six times in water to remove most of the DETA, then it was washed in running water for 1.5 hours (5400 s) to remove all traces of free amine. After squeezing out all excess water then further blotting dry, it was oven dried for one hour. At a 4" (101.6 mm) spacing of the clamps, the resistance was found to be $1.3 \times 10^5$ ohms. After further drying for 18 hours (64800 s) at 135° C., the 4" (101.6 mm) resistance was measured to be $2.6 \times 10^8$ ohm.

EXAMPLE 2

A. To compare the effects of chlorinated copolymer loading on the resistance of the foams, three uniform pieces of foam 6.5" (165.1 mm) square×0.5" (12.7 mm) thick were prepared. Number 1 had 20 parts of the 90/10 copolymer powder, Number 2 had 30 parts, and Number 3 had 40 parts. The foam formulation was that of Example I-C except for the amount of halogenated copolymer. The copolymer was the same 90/10 vinylidene chloride/vinyl chloride employed in Example 1.

The three pieces of foam were treated with DETA at the same time in glass trays. After 30 minutes (1800 s) of treatment, the three pieces of foams were thoroughly washed with running water for 2 hours (7200 s), squeezed, and oven-dried at 130° C. for 18 hours (64800 s). At a 4" (101.6 mm) clamp spacing the resistance of the three pieces of black foam was found to be:

Number 1 $6 \times 10^8$ ohms (20 pph* copolymer)
Number 2 $3 \times 10^8$ ohms (30 pph copolymer)
Number 3 $2 \times 10^8$ ohms (40 pph copolymer)
*parts per one hundred parts by weight of polyol B. The three foam samples of Example (2-A) were also subjected to static decay time tests, using an Electro Tech 406C Static Decay Meter.

These three foams were tested for their ability to discharge applied static voltage of 5000 volts to 50 volts (1%):

Sample Number 1: <2 sec.
Sample Number 2: <2 sec.
Sample Number 3: <2 sec.
Control (Ex. 1-A): >40 sec.

These tests showed the ability of the conductive foam to discharge static electricity as compared with the control containing no treated halogenated copolymer.

EXAMPLE 3

A. A box foam was made using the following ratio of ingredients:

I

Polyol from Example 1: 100 parts
Water: 4 parts
L-560 silicone surfactant: 0.9 parts
Amine 200 catalyst: 0.1 parts
90/10 vinylidene chloride/vinyl chloride copolymer: 20 parts

II

Toluene Diisocyanate (TDI): 52.6 parts
Stannous Octoate: 0.1 parts

These ingredients were mixed in a high speed mixing chamber and charged to a cardboard box 18"×18"×18" (457.2 mm×457.2 mm×457.2 mm). The mixture foamed and filled the box, producing a cream white flexible foam.

A control specimen was cut for a resistivity measurement. The specimen was 1" (25.4 mm) square and 6" (152.4 mm) long.

The resistance of the foam was measured as described in Example 1. The spring clamps were clamped on either end of the sample, spaced 4" (101.6 mm) apart, and connected to a Keithley 660 electrometer. The resistance was measured in ohms and found to be greater than $1 \times 10^{12}$ ohms.

B. Another 1"×1"×6" (25.4 mm×25.4 mm×152.4 mm) test specimen was cut, and this specimen was dried in an oven at 40° C. for 24 hours (86400 s). Its resistivity, with clamps 4" (101.6 mm) apart, was greater than $1 \times 10^{12}$ ohms.

C. A third specimen 1"×1"×6" (25.4 mm×25.4 mm×152.4 mm) was now thoroughly washed in water, squeezed dry, and then oven-dried for 24 hours (86400 s). Its resistivity was found to be greater than $1 \times 10^{12}$ ohms.

D. A test specimen 1"×1"×6" (25.4 mm×25.4 mm×152.4 mm) was now cut, and this specimen was immersed in diethylenetriamine (DETA) for 30 minutes (1800 s). It turned black in color. It was then thoroughly washed in water until free of amine, then oven dried for 24 hours (86400 s). Its resistivity was now measured and found to be $2.5 \times 10^9$ ohms.

EXAMPLE 4

A. A box foam was now made as before except 40 pph of the 90/10 vinylidene chloride/vinyl chloride copolymer powder was used. Again a good cream-colored flexible foam resulted. A test strip 1"×1"×6" (25.4 mm×2.54 mm×152.4 mm) was made and with clamps 4" (101.6 mm) apart its resistance was found to be greater than $1 \times 10^{12}$ ohms.

B. An oven dried strip had resistance greater than $1 \times 10^{12}$ ohms.

C. A water washed and oven dried strip had a resistance greater than $1 \times 10^{12}$ ohms.

D. A 1"×1"×6" (25.4 mm×25.4 mm×152.4 mm) strip was treated with DETA for 3 minutes (180 s), washed free of amine and oven dried. Its resistance at 4" (101.6 mm) was measured and found to be $2.5 \times 10^9$ ohms.

These experiments show that the presence of a dehydrohalogenated halogen-containing copolymer lowers the resistivity at least three orders of magnitude.

EXAMPLE 5

A. A cup foam was made using 100 parts of the aforementioned polyether thiol plus 4 parts water plus 0.9 parts L-560 silicone surfactant and 0.1 parts of NIAX A-200 (tertiary amine catalyst commerically available from Union Carbide Corp.). In the TDI was put 0.15 parts of stannous octoate catalyst.

These ingredients were mixed in a high speed mixer and poured into a one-half gallon (1.89 l) cardboard cup, producing a cream white flexible polyurethane foam.

The foam was cut to give a 4"×4"×1" (101.6 mm×101.6 mm×25.4 mm) square slab. Its resistance was measured by ASTM D-257-66. In this test, the foam was put between two 4"×4" (10.16 mm×101.6 mm) plates with a guard plate surrounding the sample. A factor to convert the measured resistance to specific or volume resistivity was calculated. The foam sample was tested and found to have a specific resistance of $1.2 \times 10^{13}$ ohm cm.

B. A foam similar to Example 5-A was made except it contained 20 pph of the 90/10 vinylidene chloride/vinyl chloride copolymer.

A- 4"×4"×1" (101.6 mm×101.6 mm×25.4 mm) piece of this foam was cut and tested by ASTM D-257-66. Its specific resistance was found to be $5 \times 10^{12}$ ohm cm.

C. A third foam containing 40 pph of the 90/10 copolymer was made as before. Its specific resistance was found to be $5 \times 10^{12}$ ohm cm.

D. A 4"×4"×1" (101.6 mm×101.6 mm×25.4 mm) piece of foam containing 40 pph 90/10 copolymer powder as in Example 5-C was immersed in DETA for 2 hours (7200 s) then water washed until free of amine then dried in an oven. The specific resistance was measured and found to be $1.6 \times 10^{10}$ ohm cm.

We claim:

1. A method for preparing an electroconductive foam which comprises:
   (1) saturating a foam comprising a polymer containing a plurality of urethane or thiourethane or thiourea or isocyanurate or thioisocyanurate or a combination of such groups which foam also contains a halogenated polymer with a dehydrohalogenating agent at a temperature and time sufficient to at least partially dehydrohalogenate the halogenated polymer;
   (2) washing the foam with a suitable inert medium so as to substantially remove the dehydrohalogenating agent and
   (3) drying the thus treated foam.

2. A method of claim 1 wherein said dehydrohalogenating agent is a primary amine and the foam saturated therewith is subject to a temperature of from about 15° C. to about 250° C. for from about 2 minutes to about 14 days.

3. A method of claim 2 wherein said treated foam is subjected to a temperature of from about 25° C. to about 120° C. for from about 8 minutes to about 8 hours.

4. A method of claim 3 wherein said dehydrohalogenating agent is a polyalkylene polyamine.

5. A method of claim 4 wherein said polyalkylene polyamine is diethylenetriamine.

6. A method of claims 1, 2, 3, 4 or 5 wherein step 2 is accomplished by one or more water wash steps optionally followed by one or more alcohol wash steps.

7. A method of claim 6 wherein said alcohol is methanol.

8. A method of claims 1, 2, 3, 4 or 5 wherein said halogenated polymer is a polymer or copolymer containing vinyl chloride and/or vinylidene chloride copolymer.

9. A method of claim 6 wherein said halogenated polymer is a polymer or copolymer containing vinyl chloride and/or vinylidene chloride copolymer.

10. A method of claim 7 wherein halogenated polymer is a polymer or copolymer containing vinyl chloride and/or vinylidene chloride copolymer.

* * * * *